Sept. 26, 1961 L. R. MORPHEW 3,001,820
FOLDABLE SEAT
Filed Sept. 21, 1959
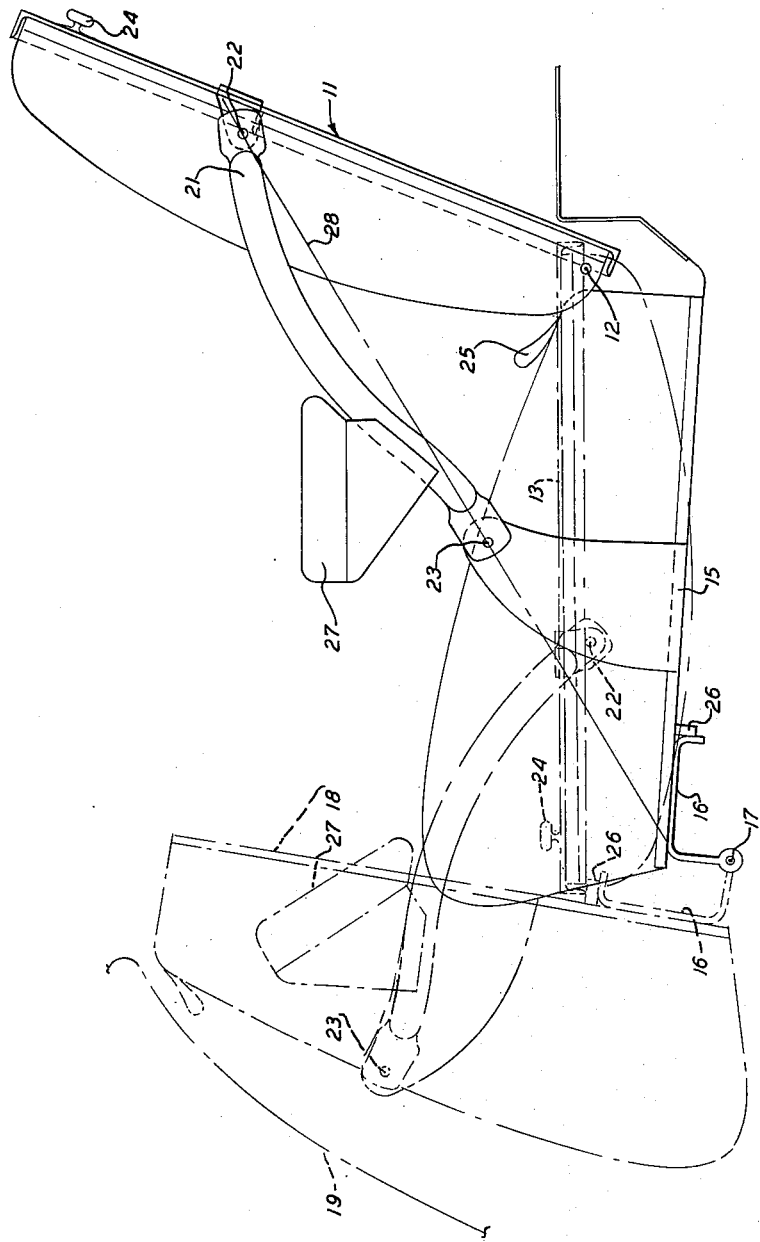
LAURENCE R. MORPHEW
INVENTOR.
BY John R. Faulkner
John J. Roethel
ATTORNEYS

United States Patent Office 3,001,820
Patented Sept. 26, 1961

3,001,820
FOLDABLE SEAT
Laurence R. Morphew, Harlow, England, assignor to Ford Motor Company, Dearborn, Mich., a corporation of Delaware
Filed Sept. 21, 1959, Ser. No. 841,127
Claims priority, application Great Britain Apr. 23, 1959
2 Claims. (Cl. 297—324)

This invention relates to folding seats for motor vehicles.

It is a known practice for the rear seats of the so-called station wagon model vehicles to fold forward so that the rear part of the seat back functions as an extension of a fixed rear floor.

The invention consists of a folding seat, particularly suitable for use as a rear seat in a station wagon, comprising a back portion and a seat portion linked together and pivoted about fixed points so that as the seat portion is pivoted forwardly and upwardly from its normal generally horizontal position, the back portion is pivoted forwardly and downwardly to a generally horizontal position.

Preferably the back and seat portions are so linked that each can be actuated forwardly by forward manual actuation of the other.

Provision is made for return actuation, by actuation of the back portion, as the seat portion, in its forward position, is locked by the relative positions of the link axes and the back portion hinge center.

The invention will be further described with reference to the accompanying drawing, which shows an exemplary embodiment of the invention in side elevation.

The drawing shows a rear seat back rest cushion assembly, generally designated 11 hinged to the body structure at 12 so that it will fold forwards and downwards to form an extension 13 of the fixed rear floor 14.

It also shows a cushion assembly 15 hinged to a heelboard 16 at a point 17 which is fixed relative to the body structure. This cushion will fold upwards and forwards to a nearly vertical position shown at 18 behind the front seats 19.

Curved links 21 are attached to each side of the back rest cushion assembly 11 and seat cushion 15 by means of brackets at 22 and 23 respectively. A handle 24 is attached to the top center of the back rest cushion assembly 11 and a looped strap 25 is fixed to the rear center of the seat cushion 15.

The seat cushion 15 is provided with one or more abutments 26 to support the back rest cushion assembly 11 in the forward position (shown in dot and dash outline).

An arm rest 27 may be provided on the link 21, which is curved over the rear wheel arch. Such arm rest may be detachable.

Operation to the closed position may be achieved by pulling the strap 25 upwards and forwards when the seat cushion 15 and back rest cushion assembly 11 both move to the positions shown in dot and dash outline. Provided that the thrust axis 28 joining the points 22—23 passes above the point 17 this operation may also be achieved by a forward movement of handle 24, the actual thrust required being dependent on the distance between the axis 28 and the point 17.

Opening to the seating position is by pulling handle 24 upwards and backwards.

Thus operation is merely a single, one-handed operation, and closing may be effected by either the strap or the handle.

It will be noted that in the open position the weight of the cushion has a considerable moment about the point 17, so that, provided axis 28 is not too far above point 17 the system is inherently stable and no additional catches or the like will be necessary to maintain the status quo. In the closed position similar considerations apply so that the arrangement disclosed is essentially simple to operate and virtually foolproof.

It will be understood that the invention is not to be limited to the exact construction shown and described, but that various changes and modifications may be made without departing from the spirit and scope of the invention as defined in the appended claims.

What is claimed is:

1. A folding seat comprising a back portion and a seat portion, means pivotally mounting each of said portions for pivotal movement about respective fixed pivot axes, linkage means linking said portions together, said linkage means being so constructed and arranged that pivotal movement of said seat portion forwardly from a normal generally horizontal position causes said back portion to be pivoted forwardly and downwardly to a generally horizontal position, said linkage means comprising a link pivotally connected to each portion, the line of thrust defined by the points of pivotal connection of said link passing close to and above the fixed axis about which the seat portion is pivoted whereby the seat is rendered inherently stable in either the seating or open position.

2. A folding seat comprising a back portion and a seat portion, means pivotally mounting each of said portions for pivotal movement about respective fixed pivot axes, linkage means linking said portions together, said linkage means being so constructed and arranged that pivotal movement of either seat portion forwardly results in a correlated forward movement of the other, said seat portion being swingable forwardly from a normal generally horizontal position and said back portion being swingable forwardly and downwardly to a generally horizontal position, said linkage means comprising a link pivotally connected to each portion, the line of thrust defined by the points of pivotal connection of said link passing close to and above the fixed axis about which the seat portion is pivoted whereby the seat is rendered inherently stable in either the seating or open position.

References Cited in the file of this patent

UNITED STATES PATENTS 2,152,505   Stuart _____ Mar. 28, 1939
2,926,948   Koplin _____ Mar. 1, 1960